United States Patent [19]
Kim

[11] Patent Number: 6,072,543
[45] Date of Patent: Jun. 6, 2000

[54] PRIORITY ORDER PROCESSING CIRCUIT AND METHOD FOR AN MPEG SYSTEM

[75] Inventor: Eui-Gyu Kim, Ahnyang, Rep. of Korea

[73] Assignee: Samsung Electronics Co., Ltd., Kyungki-Do, Rep. of Korea

[21] Appl. No.: 08/845,054

[22] Filed: Apr. 21, 1997

[30] Foreign Application Priority Data

Apr. 19, 1996 [KR] Rep. of Korea ......................... 96-11950

[51] Int. Cl.[7] ...................................................... H04N 7/00
[52] U.S. Cl. .............................. 348/725; 348/10; 709/219
[58] Field of Search ..................................... 348/6, 12, 10, 348/725, 720; 709/100, 101, 102, 103, 217, 219, 218; 710/40, 41, 44, 45, 244, 264, 265; 772/203

[56] References Cited

U.S. PATENT DOCUMENTS 4,633,392  12/1986  Vincent et al. .
4,796,176  1/1989   D'Amico .
4,803,617  2/1989   Berarducci .

*Primary Examiner*—Nathan Flynn
*Attorney, Agent, or Firm*—Sughrue, Mion, Zinn, Macpeak & Seas, PLLC

[57] ABSTRACT

A priority order processing circuit is disclosed for an MPEG system adapted to determine the priority order of events generated from a multiprocessor of a decoding system utilizing MPEG1 and MPEG2 schemes while controlling operations of the system. The priority order processing circuit includes a video buffer verifier writing controller for generating a writing request signal when a situation exists for storing data in an external memory, a video buffer verifier reading controller for generating a reading request signal when a situation exists for reading the stored data, a display controller for generating a display request signal in response to recovered data received therein, a motion compensation reading controller for generating a motion compensation reading request signal when motion compensation for the stored data is requested, a motion compensation writing controller for generating a motion compensation writing request signal when the motion compensation is requested, and a priority order controller for determining a priority order for various request signals generated, respectively, from the video buffer verifier writing controller, video buffer verifier reading controller, display controller, motion compensation reading controller and motion compensation writing controller while generating a service code for executing a data processing service.

16 Claims, 4 Drawing Sheets

PRIORITY ORDER PROCESSING CIRCUIT AND METHOD FOR AN MPEG SYSTEM

BACKGROUND OF THE INVENTION

1. Field of the Invention

The present invention relates to a control circuit for an MPEG (Moving Picture Experts Group) system, and more particularly to a priority order processing circuit for an MPEG system adapted to determine the priority order of events generated from a multiprocessor of a decoding system utilizing MPEG1 and MPEG2 schemes while controlling operation of the system.

The present invention is based on Korean Patent Application No. 11950/1996, which is incorporated herein by reference for all purposes.

2. Description of the Related Art

Generally, an MPEG system is a system for digitally converting audio or video information so that the information can be stored or transferred for the use or re-use thereof. In other words, such an MPEG system is adapted to provide for ease in handling audio or video information. To this end, the MPEG system essentially includes a coder/decoder for encoding audio or video information and for decoding coded information. An example of an MPEG system is illustrated in FIG. 1.

FIG. 1 is a block diagram illustrating the configuration of a conventional MPEG system. As shown in FIG. 1, the MPEG system includes a video decoder 14 for decoding a stream of coded video data, thereby outputting recovered video data, and a dynamic random access memory (DRAM) 15 (hereinafter, referred to as "memory") for storing the recovered video data output from the video decoder 14. A display controller 16 is also provided which serves to display the video data recovered by the video decoder 14 on a display unit (not shown). The MPEG system further includes a central processing unit (hereinafter, referred to as "CPU") 18 for controlling the entire operation of the MPEG system, and a main memory 20 for storing system information and accessing that stored information under control of the CPU 18.

In FIG. 1, the reference numeral 24 denotes a storage medium, in particular, a large-capacity storage medium such as a hard disk. Coded video or audio data streams are stored in the storage medium 24. The reference numeral 26 denotes an audio decoder which serves to decode coded audio data, thereby outputting recovered audio data. All the elements mentioned above are controlled by the CPU 18 to which those elements are coupled via a system bus 22.

The MPEG system having the configuration shown in FIG. 1 performs the following data processing under control of the CPU 18.

When the video decoder 14 operates under control of the CPU 18, it accesses coded bit stream data stored in the storage medium 24 and recovers video data from the accessed data. The video decoder 14 then controls the memory 15 to store the recovered video data. The recovered video data stored in memory 15 may be subsequently read for performing motion compensation or for display on a screen. For example, where motion compensation is necessary, the recovered video data stored in the memory 15 is read in accordance with a desired operation of the video decoder 14. For display on the screen, the video data, which has been recovered and motion compensated, is transferred to the display controller 16. The display controller 16 sends the recovered video data received from the video decoder 14 to a display unit (not shown) under control of the CPU 18 to display the recovered video. The audio decoder 26 also operates in a manner similar to the video decoder 14.

During the above-mentioned operation, the CPU 18 performs instructions for various jobs required for recovery of the video data. When the CPU 18 receives requests for jobs from data processors, such as the display controller 16 and audio decoder 26, it determines a priority order for processes respectively associated with those jobs requests. In accordance with the determined priority order, the CPU 18 performs allocation of authorities for jobs to execute a desired data processing operations. The CPU 18 also executes an operation for transferring system information, which is extracted from input data and stored in the main memory 20, at the request of the video decoder 12.

In the conventional MPEG system configured as shown in FIG. 1, however, the priority order for job requesting signals generated from various data processors is processed by an additional processor, namely, the CPU. As a result, it is necessary to execute a procedure which should use additional programming. In this case, there is an increase in costs because use of the CPU is expensive. This conventional MPEG system also has a problem in that the processing speed is low. This is because the priority order for job request signals generated from data processors is determined by the CPU which operates in accordance with a program.

SUMMARY OF THE INVENTION

Therefore, an object of the invention is to provide an MPEG system including a priority order processing circuit capable of rapidly determining the priority order for job request signals respectively generated from a plurality of data processors.

Another object of the invention is to provide a circuit for determining the priority order for job request signals respectively generated from a plurality of data processors without using a central processing unit.

Another object of the invention is to provide an apparatus for determining the priority order for a multiple decoding process associated with a decoder in an MPEG system and rapidly performing the decoding process in accordance with the determined priority order.

Yet another object of the invention is to provide an method for generating a service code for servicing a plurality of controllers according to a predetermined priority order.

In accordance with the present invention, these objects are accomplished by providing a priority order processing circuit for a Motion Picture Experts Group (MPEG) system comprising: a video buffer verifier writing controller for generating a writing request signal when a situation exists for storing data in an external memory; a video buffer verifier reading controller for generating a reading request signal when a situation exists for reading data stored in the external memory; a display controller for generating a display request signal in response to recovered data received therein; a motion compensation reading controller for generating a motion compensation reading request signal when motion compensation for the data stored in the external memory is requested; a motion compensation writing controller for generating a motion compensation writing request signal when storing motion compensated data in the external memory is requested; and a priority order controller for determining a priority order for at least one of the request signals generated by the video buffer verifier writing controller, the video buffer verifier reading controller, the display controller, the motion compensation reading controller and the motion compensation writing controller, and generating a service code for executing a data processing service based on the determined priority order.

The priority order processing controller comprises a latch circuit for latching request signals generated from a plurality of the controllers; a priority order decoder coupled to the latch circuit and receiving the latched request signals, generating a motion compensation holding signal in response to activation of at least one of the latched request signals, decoding activated states of the latched request signals in accordance with a predetermined priority order and outputting a signal corresponding to one of the latched request signals which has a higher priority than the remaining request signals; a multiplexor for outputting the output from the priority order decoder as a service code in response to the motion compensation holding signal; and a service completion control signal generating circuit for initializing outputs of the latch circuit in response to activation of service completion signals from a plurality of associated controllers, respectively.

In order to accomplish another of the objects of the invention, there is provided a method for generating a service code from service requests according to a predetermined priority order, comprising: latching a first plurality of the service requests generated by a plurality of controllers, respectively; outputting one of the first plurality of service requests which has a highest priority among the first plurality of service requests according to a predetermined priority order; and outputting another one of the first plurality of service requests which has a next highest priority according to a predetermined priority order among the first plurality of service requests, after outputting the service request having the highest priority, wherein the service request output causes the corresponding controller to be serviced.

BRIEF DESCRIPTION OF THE DRAWINGS

The above and other objects, advantages and aspects of the present invention will become more apparent by describing in detail a preferred embodiment thereof with reference to the accompanying drawings in which.

DETAILED DESCRIPTION OF THE INVENTION

A preferred embodiment of a priority order processing circuit for an MPEG system according to the present invention is described below in detail with reference to the accompanying drawings.

Figure 1:
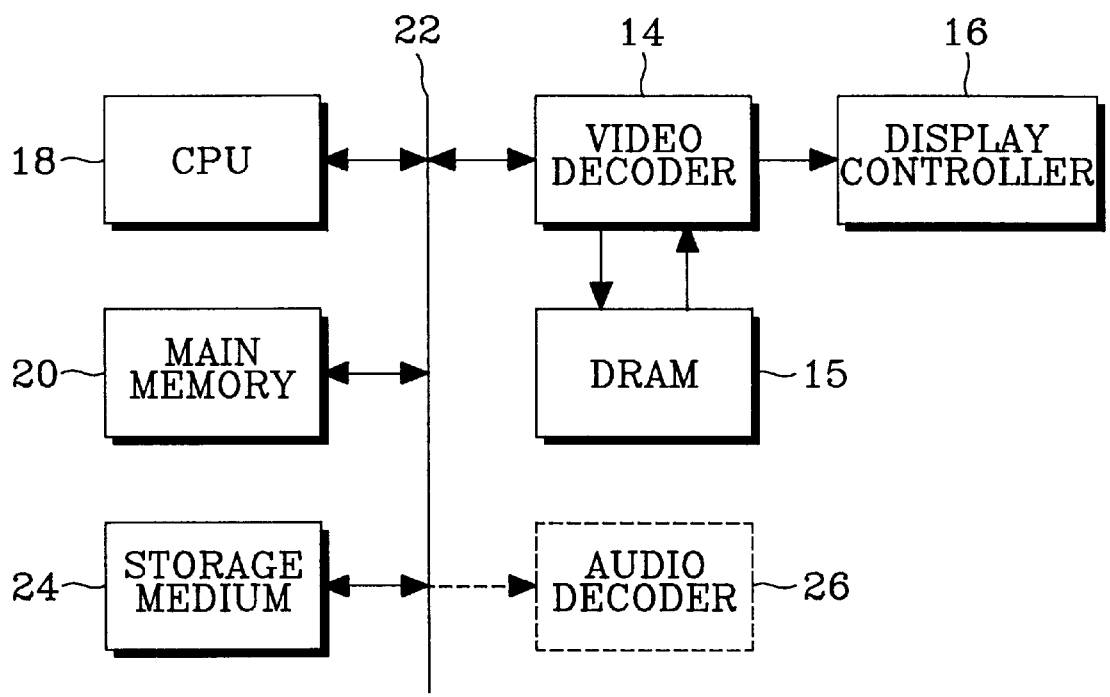
FIG. 1 is a block diagram illustrating the configuration of a conventional MPEG system.
Figure 2:
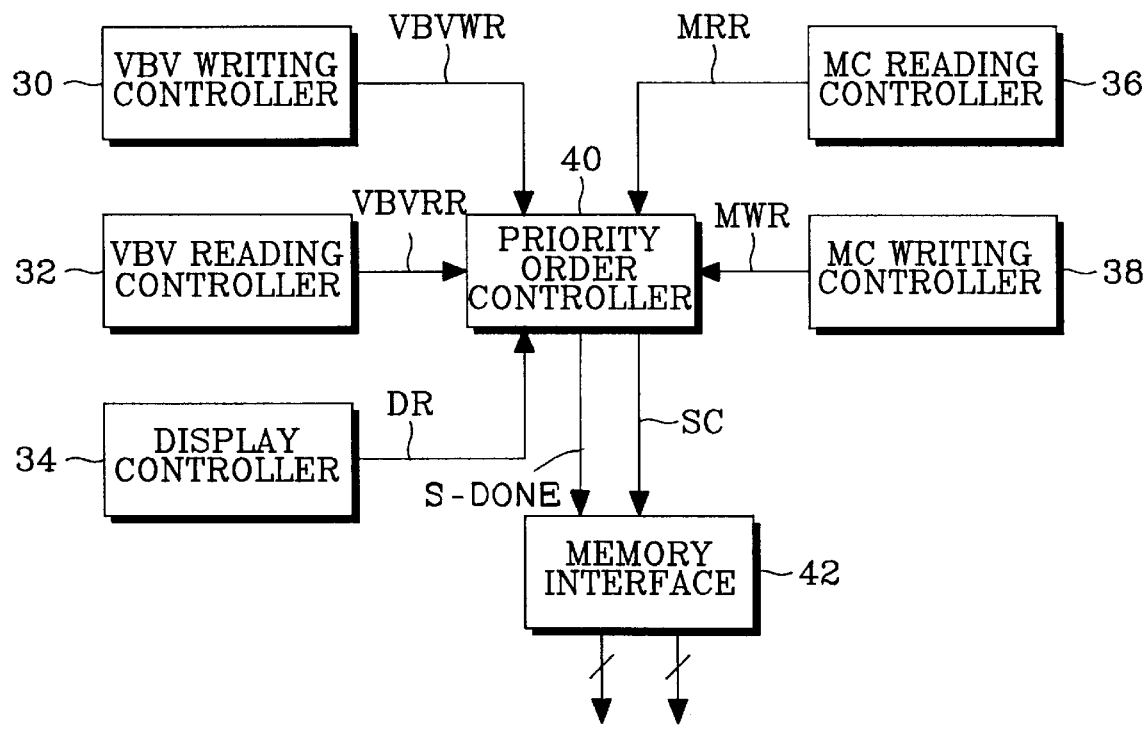
FIG. 2 is a block diagram illustrating a priority order processing circuit for an MPEG system in accordance with the present invention.

FIG. 2 is a block diagram illustrating a priority order processing circuit for an MPEG system in accordance with the present invention. As shown in FIG. 2, the priority order processing circuit includes a video buffer verifier (VBV) writing controller 30 for generating a writing request signal VBVWR when a situation exists for storing data in an external memory (not shown). The priority order processing circuit also includes a VBV reading controller 32 for generating a reading request signal VBVRR when a situation exists for reading data stored in the external memory. A display controller 34 is also provided which generates a display request signal DR in response to recovered data received therein. The priority order processing circuit further includes a motion compensation (MC) reading controller 36 for generating an MC reading request signal MRR when motion compensation is requested to be performed for the data stored in the external memory, and an MC writing controller 38 for generating an MC writing request signal MWR when motion compensation has been performed and the motion compensated data is to be stored in the external memory. A priority order controller 40 is provided for determining the priority order for processing the various request signals respectively generated by the VBV writing controller 30, VBV reading controller 32, display controller 34, MC reading controller 36 and MC writing controller 38. The priority order controller generates a service code SC for executing a data processing service and generates a service-done signal S-done in response to a service completion signal received therein. A memory interface 42 is provided for externally interfacing the SC and S-done signals output from priority order controller 40.

Figure 3:
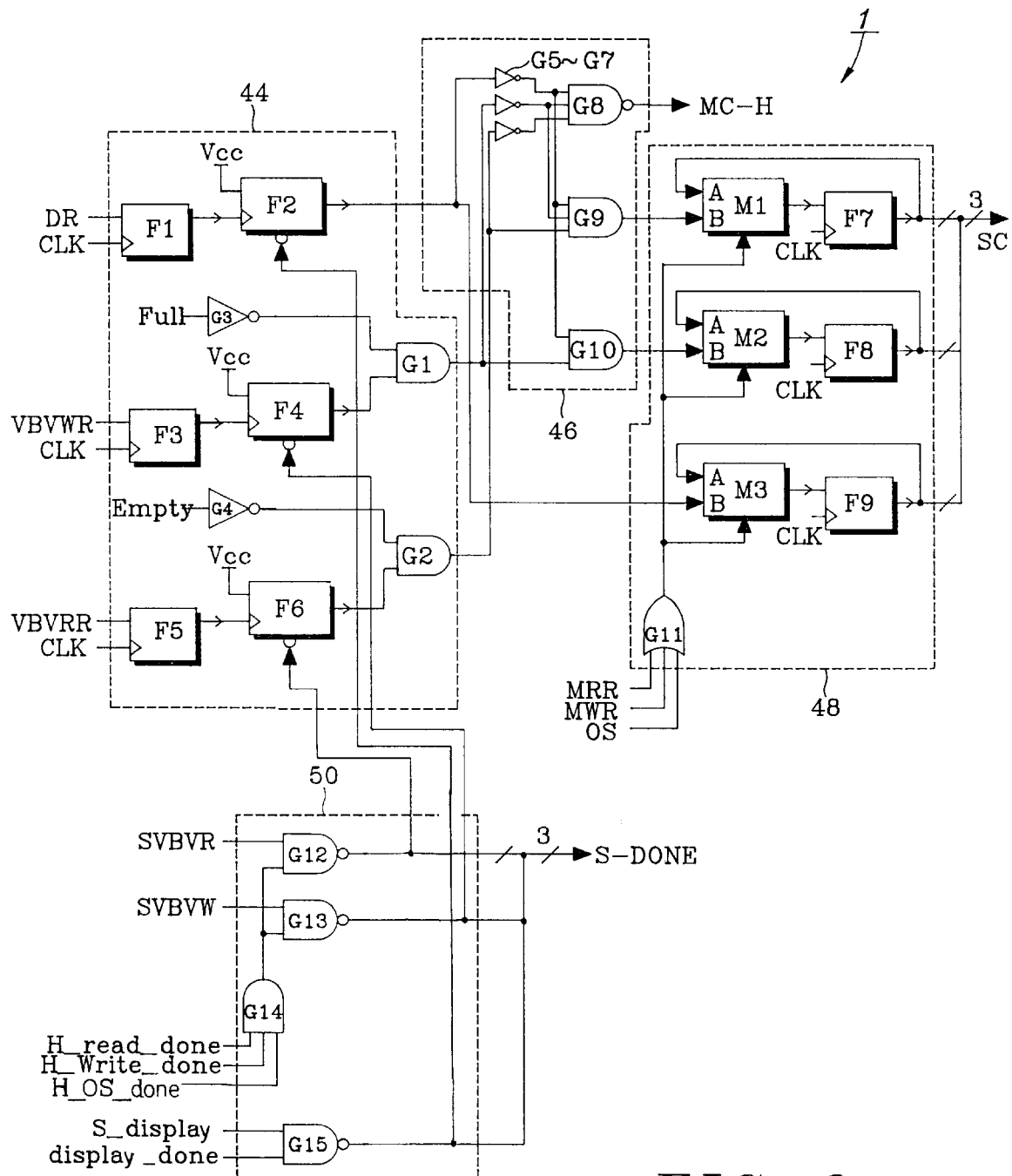
FIG. 3 is a circuit diagram illustrating a specific embodiment of the priority order controller shown in FIG. 2.

FIG. 3 is a circuit diagram illustrating a specific embodiment of the priority order controller shown in FIG. 2. As shown in FIG. 3, the priority order controller includes a latch circuit 44 for latching inputs, namely, request signals generated from a plurality of controllers. For example, latch circuit 44 latches the VBV writing request signal VBVWR, VBV reading request signal VBVRR and display request signal DR. Latch circuit 44 also serves to reset the latched request signals in response to service completion signals, received by latch circuit 44, which are respectively associated with the latched request signals. Latch circuit 44 includes a plurality of flip-flops F1 to F6.

A priority order decoder 46 is coupled to output terminals of latch circuit 44 from which the latched request signals are output, respectively, in such a manner that priority order decoder 46 receives the latched request signals in accordance with a predetermined priority order. Priority order decoder 46 generates a motion compensation (MC) holding signal MC-H in response to activation of at least one of the latched request signals and decodes activated states of the request signals, thereby outputting one of the request signals which has a priority higher than the remaining request signals.

The priority order controller further includes a multiplexor unit 48 for outputting the output from priority order decoder 46 as a service code SC in response to the MC holding signal MC-H.

The priority order controller further still includes a service completion control signal generating circuit 50 for initializing the outputs from latch circuit 44 in response to activation of service completion signals received from a plurality of associated controllers, respectively.

Figure 4:
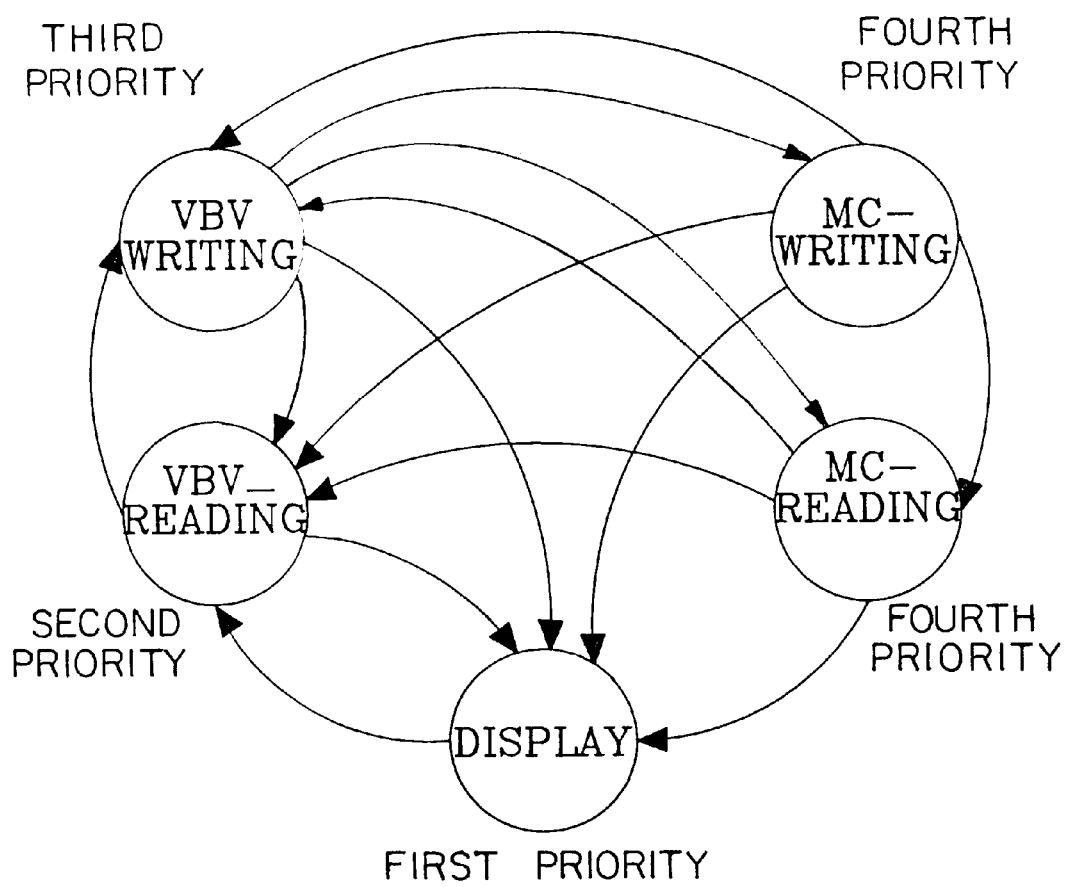
FIG. 4 is a state diagram illustrating priority order transitions in accordance with the present invention.

FIG. 4 is a state transition diagram illustrating priority order transitions in accordance with the present invention. As shown in FIG. 4, request signals simultaneously generated from a plurality of controllers, such as VBV writing controller 30, VBV reading controller 32, display controller 34, MC reading controller 36 and MC writing controller 38, are processed in the order shown in FIG. 4. For example, when a request signal is generated from an optional controller which has a priority lower than request signals already generated, a service associated with that lower priority request signal is executed after completion of services associated with the request signals having the higher priorities.

Now, an example of the priority order processing procedure according to the present invention will be described in detail in conjunction with FIG. 3, which is executed in the MPEG system of FIG. 2.

First, it is assumed that a plurality of request signals respectively generated from a plurality of controllers shown in FIG. 2 are simultaneously input to the priority order controller 40. The plurality of controllers includes VBV writing controller 30, VBV reading controller 32, display controller 34, MC reading controller 36 and MC writing controller 38. The request signals include VBVWR (VBV writing request signal), VBVRR (VBV reading request signal), DR (display request signal), MRR (motion compensation reading request signal), and MWR (motion compensation writing request signal). In the present example the display request signal has the highest or first priority, the VBV reading request signal has the second highest priority, the VBV writing request signal has the third highest priority, and the motion compensation reading and writing request signals have the lowest or fourth highest priority.

The VBVWR, VBVRR and DR signals are input to flip-flops F1, F3 and F5 of latch circuit 44 and are latched in those flip-flops in accordance with clock signals applied to those flip-flops, respectively. On the other hand, the latched VBVWR, VBVRR and DR signals are sent to flip-flops F2, F4 and F6 which are coupled to output nodes of flip-flops F1, F3 and F5, respectively. Flip-flops F2, F4 and F6 latch the received request signals VBVWR, VBVRR and DR therein.

An output from flip-flop F2 is sent to an inverter G5 included in priority decoder 46. The output from flip-flop F2 is also applied to a multiplexor M3 included in multiplexor unit 48. On the other hand, outputs from flip-flops F4 and F6 are applied to AND gates G1 and G2, respectively, which are included in the latch circuit 44. The AND gates G1 and G2 also receive outputs from inverters G3 and G4, respectively, which are included in latch circuit 44. The outputs of inverters G3 and G4 are signals respectively indicative of data states in the video buffer, namely, a buffer full state and a buffer empty state. Accordingly, AND gate G1 outputs an activated signal, such as a logic-high signal, when a VBVWR signal is generated under the condition in which the video buffer is not in its data full state. On the other hand, AND gate G2 outputs an activated signal, such as a logic-high signal, when a VBVRR signal is generated under the condition in which the video buffer is not in its data empty state. Such a configuration is adapted to prevent writing/reading operations when writing/reading requests are made under the condition in which there is no data writing area available in the video buffer or no data to be read from the video buffer.

The VBVWR and VBVRR signals output from AND gates G1 and G2 are applied to inverters G6 and G7, respectively, which are included in priority decoder 46. These signals VBVWR and VBVRR are also sent to AND gates G10 and G9, respectively, which are included in priority decoder 46. Inverters G5, G6 and G7 of priority decoder 46, which receive output signals from latch circuit 44, invert the received signals which are, in turn, sent to a NAND gate G8 included in priority decoder 46. The output from inverter G5 is also applied to AND gates G9 and G10 included in priority decoder 46. The AND gate G9 also receives the output from inverter G6. The AND gates G9 and G10 send their outputs to multiplexors M2 and M3, respectively, which are included in multiplexor unit 48. In accordance with such a configuration, NAND gate G8 of priority decoder 46 outputs a signal having a logic value of 1 when at least one of the request signals input to latch circuit 44 is in its activated state, such as in its logic "1" state. In this case, an activated MC holding signal MC-H is output from priority decoder 46.

When the MC holding signal MC-H output from the priority decoder 46 is in an activated state, such as a logic "1" state, it serves to hold operations of the MC reading controller 36 and MC writing controller 38. In this case, MC reading and writing operations are temporarily stopped. In other words, generation of the MC reading request signal MRR and MC writing request signal MWR, which are set to have a lower priority than the VBV writing request signal VBVWR, VBV reading signal VBVRR and display request signal DR, is terminated. When the operations of the MC reading controller 36 and MC writing controller 38 are stopped because of activation of motion compensation holding signal MC-H having a logic value of "1," both the request signals MRR and MWR, which are applied to an OR gate G11 included in multiplexor unit 48, have a logic value of 0. OR gate G11 can also receive a signal "OS" which is an "other signal" such as a memory refresh signal. Multiplexors M1 to M3 of multiplexor unit 48 receive an output from OR gate G11. When multiplexors M1 to M3 receive an output from OR gate G11 resulting from request signals MRR and MWR having a logic value of 0, they select signals which are decoded in accordance with a given priority order and received at respective input terminals B thereof. The selected signals are output as service codes SC. The multiplexors M1 to M3 also have input terminals A for receiving output signals from flip-flops F7 to F9, respectively, which are included in multiplexor unit 48. The flip-flops F7 to F9 are coupled to output terminals of multiplexors M1 to M3, respectively.

For example, when a display request signal DR having a logic value of "1" is applied to flip-flop F1, flip-flop F2 outputs a signal having a logic value of "1." As a result, NAND gate G8 outputs an activated MC holding signal MC-H having a logic value of "1." Based on this signal MC-H, the MC reading controller 36 and MC writing controller 38 stop their operations. Accordingly, OR gate G11 outputs a low-level signal. Based on this low-level signal output from OR gate G11, multiplexor M3 selects the signal input to its input terminal B, namely, a display request signal DR output from flip-flop F2, and sends the selected signal to flip-flop F9. Flip-flop F9 latches and outputs the display request signal DR. Thus, the service code SC, represented by 3 bits, which is output from multiplexor unit 48, is changed.

Where latch circuit 44 receives at least two active request signals, it latches the received signals and then sends them to priority order decoder 46. Priority order decoder 46 decodes the latched request signals, thereby generating a decoded signal for generating a service code SC having the highest priority. For example, when the VBVWR and VBVRR signals are generated in a simultaneous manner, AND gate G9, which receives VBVRR via AND gate G2, cannot output the received VBVRR signal because the output from AND gate G1 is also applied to AND gate G9 after being inverted from a high level to a low level by inverter G6. In this case, AND gate G10, which receives the VBVRR signal via AND gate G1, outputs the received VBVRR signal because the output from flip-flop F2 is also applied to AND gate G10 after being inverted from a low level to a high level by inverter G5. This means that the VBV writing request signal VBVWR has a priority over the VBV reading request signal VBVRR.

In other words, when a VBV reading request signal VBVRR and a VBV writing request signal VBVWR, having a priority over VBVRR, are simultaneously activated, only the VBVWR signal, which is set to have the higher priority, is output from AND gate G10, because the output from AND gate G9 associated with the VBVRR signal is at a low level.

The service code SC, corresponding to the request signal having the highest priority, generated in accordance with the above-mentioned operation, is then sent, via the memory interface 42, to a control block which executes a service associated with that request signal. When the service associated with the request signal generated from an optional controller is completely executed under the control of the control block, the controller generates a service completion signal.

For example, where the control block executes and completes a service associated with a display request signal DR generated from display controller 34, the display controller 34 outputs a display control completion signal S-display, display-done which has a logic "high" level. The display control completion signal S-display, display-done is applied to a NAND gate G15 included in service completion control signal generating circuit 50. Flip-flop F2 of latch circuit 44 receives an output from NAND gate G15. When NAND gate G15 receives a display control completion signal S-display, display-done having a logic "high" level, it outputs a low-level signal. In accordance with the low-level signal output from NAND gate G15, flip-flop F2 clears its output which has been set to a logic value of 1, thereby clearing the DR signal. Accordingly, completion of the display service is identified and the request signal having the next highest priority is allowed to be processed.

When a writing service associated with a writing request corresponding to the VBV writing request signal is completed, a writing service completion signal SVBVW is generated. The writing service completion signal SVBVW is applied to a NAND gate G13 included in service completion control signal generating circuit 50. Flip-flop F4 of latch circuit 44 receives an output from NAND gate G13. When NAND gate G13 receives a writing service completion signal SVBVW, it outputs a low-level signal. In accordance with the low-level signal output from NAND gate G13, flip-flop F4 clears its output thereby clearing the VBVWR signal. Accordingly, completion of the writing service is identified and the request signal having the next highest priority is allowed to be processed.

The output from an AND gate G14 is input to NAND gates G12 and G13. AND gate G14 receives as input signals H_read_done, H_write_done and H_OS_done signals, where the "H" indicates high priority. For example, the controller outputs a high priority reading service completion signal when the controller completes a data reading function. The H_OS_done signal is a high priority "other signal."

On the other hand, a reading service completion signal SVBVR is generated when a reading service associated with a reading request corresponding to a VBV reading request signal is completed. The reading service completion signal SVBVR is applied to a NAND gate G12 included in service completion control signal generating circuit 50. Flip-flop F6 of latch circuit 44 receives an output from NAND gate G12. When NAND gate G12 receives a reading service completion signal SVBVR, it outputs a low-level signal. In accordance with the low-level signal output from NAND gate G12, flip-flop F6 clears its output. Accordingly, the completion of the reading service is identified.

On the other hand, when none of the above-mentioned three request signals has a logic value of 1, the MC holding signal MC-H, which is output from NAND gate G8 of priority order decoder 46, is set to a low level. In this state, a service code for motion compensation processing is generated. The service-done signal S-done is not generated unless all services requested are completed.

Although the above-mentioned embodiment of the present invention has been described in conjunction with a configuration for processing three request signals, the present invention may be extended to a configuration for processing more than three request signals. It is also noted that the priority order of request signals can be easily changed by changing the configuration of the service code generating circuit.

As apparent from the above description, in accordance with the present invention, it is possible to execute services respectively associated with request signals from a plurality of controllers in accordance with a given priority order by use of a simple circuit configuration. Accordingly, the present invention can be easily applied to MPEG1 and MPEG2 decoders. The present invention can also be easily applied to a system adapted to execute a multi-process. Where the present invention is applied to MPEG1 and MPEG2 decoders, a processing priority order is determined in accordance with an appropriate hardware operation. Accordingly, high-speed operation is achieved. This results in an improvement in the performance of MPEG systems. Since the circuit configuration is simplified, a reduction in costs is achieved.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A priority order processing circuit for a Motion Picture Experts Group (MPEG) system comprising:

a video buffer verifier writing controller for generating a writing request signal when a situation exists for storing data in an external memory;

a video buffer verifier reading controller for generating a reading request signal when a situation exists for reading data stored in said external memory;

a display controller for generating a display request signal in response to recovered data received therein;

a motion compensation reading controller for generating a motion compensation reading request signal when motion compensation for the data stored in said external memory is requested;

a motion compensation writing controller for generating a motion compensation writing request signal when storing motion compensated data in said external memory is requested; and a priority order controller for determining a priority order for the request signals generated by said video buffer verifier writing controller, said video buffer verifier reading controller, said display controller, said motion compensation reading controller and said motion compensation writing controller, and generating a service code for executing a data processing service based on the determined priority order.

2. The priority order processing circuit in accordance with claim 1, wherein said priority order controller comprises:

a latch circuit for latching request signals generated from a plurality of the controllers;

a priority order decoder coupled to said latch circuit and receiving the latched request signals, generating a motion compensation holding signal in response to activation of at least one of said latched request signals, decoding activated states of said latched request signals in accordance with a predetermined priority order and outputting a signal corresponding to one of said latched request signals which has a higher priority than the remaining request signals;

a multiplexor for outputting the output from said priority order decoder as a service code in response to said motion compensation holding signal; and a service completion control signal generating circuit for initializing outputs of said latch circuit in response to activation of service completion signals from a plurality of associated controllers, respectively.

3. A priority order processing circuit, comprising:

a latch circuit which receives and latches request signals from a plurality of controllers, wherein said request signals indicate if corresponding controllers request service;

a priority decoder connected to said latch circuit, decoding the latched request signals according to predetermined priority order and outputting a priority request signal having the highest priority among the latched request signals according to the predetermined priority order;

a multiplexor connected to said priority decoder and outputting the priority request signal in response to a control signal from one of the plurality of controllers; and a service completion circuit outputting reset signals to said latch circuit in response to service completion control signals received from at least one of the plurality of controllers.

4. The priority order processing circuit as recited in claim 3, wherein said priority decoder generates a hold control signal when at least one of the latched request signals indicates that one of the plurality of controllers requests service.

5. The priority order processing circuit as recited in claim 3, wherein said multiplexor outputs the priority request signal as a service code.

6. The priority order processing circuit as recited in claim 3, wherein said service completion circuit outputs a service done signal when the controllers requesting service have been serviced.

7. The priority order processing circuit as recited in claim 3, wherein said plurality of controllers comprises:

a video buffer verifier (VBV) writing controller for generating a VBV writing request signal when data is to be stored in an external-memory;

a VBV reading controller for generating a VBV reading request signal when the data stored in said external memory is to be read;

a display controller for generating a display request signal for displaying data received by said display controller;

a motion compensation reading controller for generating a motion compensation reading request signal when motion compensation for the data stored in said external memory is requested; and a motion compensation writing controller for generating a motion compensation writing request signal when storage of motion compensated data in said external memory is requested.

8. The priority order processing circuit as recited in claim 7, wherein said latch circuit comprises:

a first latch unit for latching the display request signal;

a second latch unit for latching the VBV writing request signal; and a third latch unit for latching the VBV reading request signal.

9. The priority order processing circuit as recited in claim 8, wherein said service completion circuit generates and outputs a first reset signal for resetting said first latch unit when a display completion signal is received, a second reset signal for resetting said second latch unit when a VBV writing completion signal is received, and a third reset signal for resetting said third latch unit when a VBV reading completion signal is received, wherein said first through third reset signals reset said first through third latch units, respectively.

10. The priority order processing circuit as recited in claim 9, wherein said predetermined priority order comprises said display request signal having the first highest priority, said VBV writing request signal having the second highest priority, said VBV reading request signal having the third highest priority; and said motion compensation reading request signal and said motion compensation writing request signal having the fourth highest priority.

11. The priority order processing circuit as recited in claim 9, wherein said service completion control circuit outputs a service done signal when said first through third reset signals are generated.

12. The priority order processing circuit as recited in claim 7, wherein said priority decoder generates a hold control signal when at least one of the latched request signals indicates that one of the plurality of controllers requests service, wherein the priority order processing circuit is used in a Motion Picture Experts Group (MPEG) system, and said motion compensation reading controller and said motion compensation writing controller operate according to an MPEG standard and terminate service when the hold control signal is generated.

13. A method for generating a service code from service requests according to a predetermined priority order, comprising:

latching a first plurality of the service requests generated by a plurality of controllers, respectively;

outputting one of the first plurality of service requests which has a highest priority among the first plurality of service requests according to a predetermined priority order;

outputting another one of the first plurality of service requests which has a next highest priority according to the predetermined priority order among the first plurality of service requests, after outputting the service request having the highest priority, wherein the service request output causes the corresponding controller to be serviced; and generating a holding control signal for stopping a processing operation when at least one of the latched plurality of service requests indicates that a controller requests service.

14. A method for generating a service code from service requests according to a predetermined priority order, comprising:

latching a first plurality of the service requests generated by a plurality of controllers, respectively;

outputting one of the first plurality of service requests which has a highest priority among the first plurality of service requests according to a predetermined priority order;

outputting another one of the first plurality of service requests which has a next highest priority according to the predetermined priority order among the first plurality of service requests, after outputting the service request having the highest priority, wherein the service request output causes the corresponding controller to be serviced; and resetting one of the latched plurality of service requests once the corresponding controller is serviced.

15. A method for generating a service code from service requests according to a predetermined priority order, comprising:

latching a first plurality of the service requests generated by a plurality of controllers, respectively;

outputting one of the first plurality of service requests which has a highest priority among the first plurality of service requests according to a predetermined priority order;

outputting another one of the first plurality of service requests which has a next highest priority according to the predetermined priority order among the first plurality of service requests, after outputting the service request having the highest priority, wherein the service request output causes the corresponding controller to be serviced; and generating a service done control signal when the controllers generating the plurality of service requests are serviced.

16. A method for generating a service code from service requests according to a predetermined priority order, comprising:

latching a first plurality of the service requests generated by a plurality of controllers, respectively;

outputting one of the first plurality of service requests which has a highest priority among the first plurality of service requests according to a predetermined priority order; and outputting another one of the first plurality of service requests which has a next highest priority according to the predetermined priority order among the first plurality of service requests, after outputting the service request having the highest priority, wherein the service request output causes the corresponding controller to be serviced;

wherein the method is performed in a Motion Picture Experts Group (MPEG) system.

* * * * *